United States Patent
Ochiai

(10) Patent No.: US 7,887,725 B2
(45) Date of Patent: Feb. 15, 2011

(54) CASTING DEVICE, SOLUTION CASTING APPARATUS, AND CASTING METHOD

(75) Inventor: Akinori Ochiai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 26 days.

(21) Appl. No.: 12/396,088

(22) Filed: Mar. 2, 2009

(65) Prior Publication Data

US 2009/0218721 A1 Sep. 3, 2009

(30) Foreign Application Priority Data

Mar. 3, 2008 (JP) ............................ 2008-051982

(51) Int. Cl.
*B29C 47/76* (2006.01)

(52) U.S. Cl. ...................... 264/102; 264/212; 264/216; 264/217

(58) Field of Classification Search ................. 264/102, 264/212, 216, 217; 425/74, 75, 66, 223
See application file for complete search history.

(56) References Cited

U.S. PATENT DOCUMENTS

| | | | |
|---|---|---|---|
| 6,168,412 B1 * | 1/2001 | Kometani et al. ........... | 425/210 |
| 6,767,500 B2 * | 7/2004 | Yamazaki et al. ........... | 264/556 |
| 2007/0045896 A1 * | 3/2007 | Kato et al. ................... | 264/217 |

FOREIGN PATENT DOCUMENTS

| | | | |
|---|---|---|---|
| JP | 2001-079864 A | | 3/2001 |
| JP | 2002-103358 A | | 4/2002 |
| JP | 2003-001655 A | | 1/2003 |
| JP | 2007276458 A | * | 10/2007 |
| WO | WO 2006095792 A1 | * | 9/2006 |
| WO | WO 2007119436 A1 | * | 10/2007 |

\* cited by examiner

*Primary Examiner*—Joseph S Del Sole
*Assistant Examiner*—Ninh V Le
(74) *Attorney, Agent, or Firm*—Sughrue Mion, PLLC

(57) ABSTRACT

Dope is discharged onto the peripheral surface of a rotating casting drum to form a casting bead. A decompression chamber decompresses an upstream side from the casting bead in a moving direction of the casting drum. The decompression chamber includes a sensor unit for detecting a width of the casting bead. A control section shifts outer side seal plates in the width direction based on the width data, such that the outer side seal plates are located in an upstream side from side ends of the casting bead. Upon formation of a casting bead having a new width, the control section shifts the outer side seal plates based on the new width such that the outer side seal plates are located in the upstream side from the side ends of the casting bead having the new width.

3 Claims, 13 Drawing Sheets

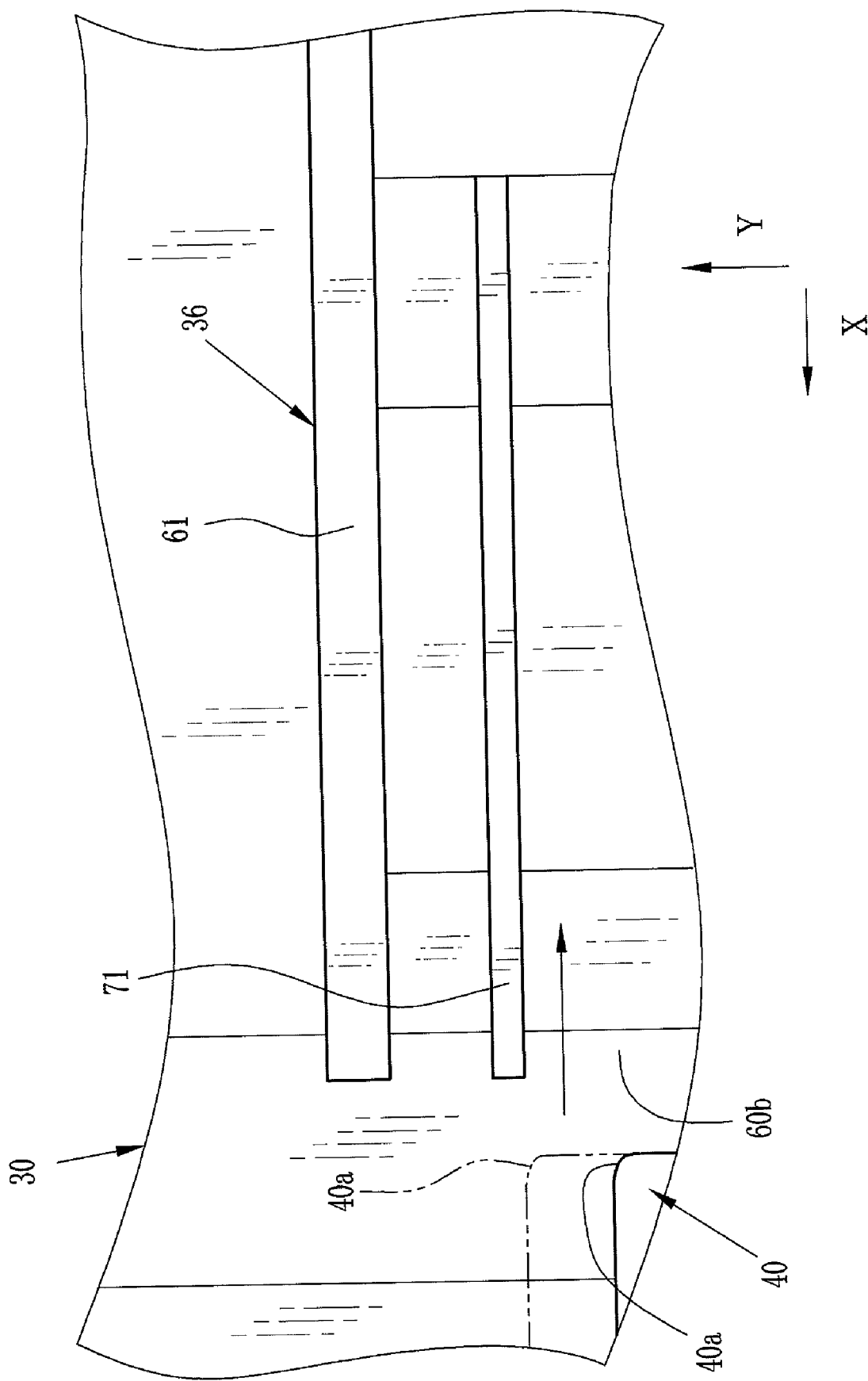

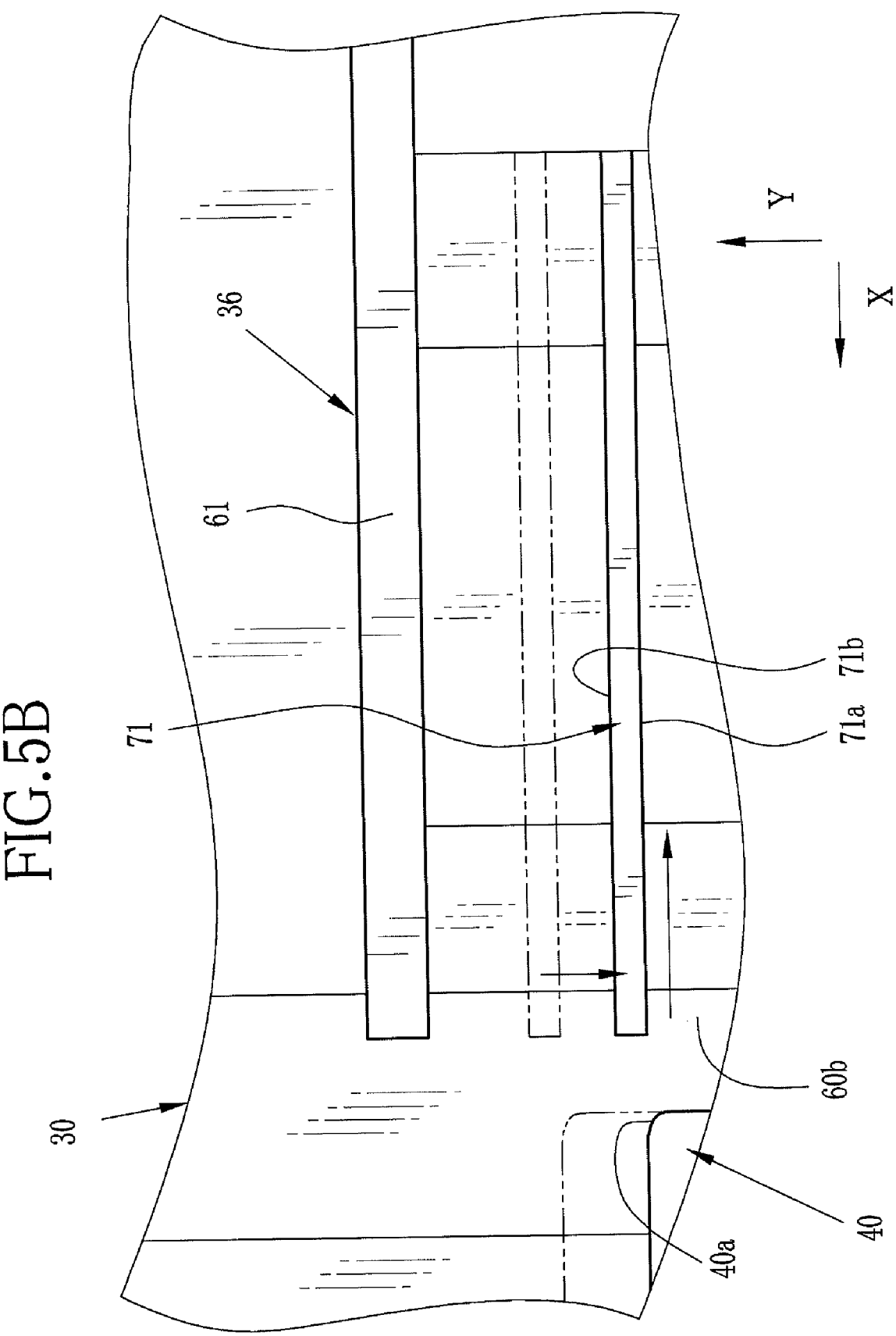

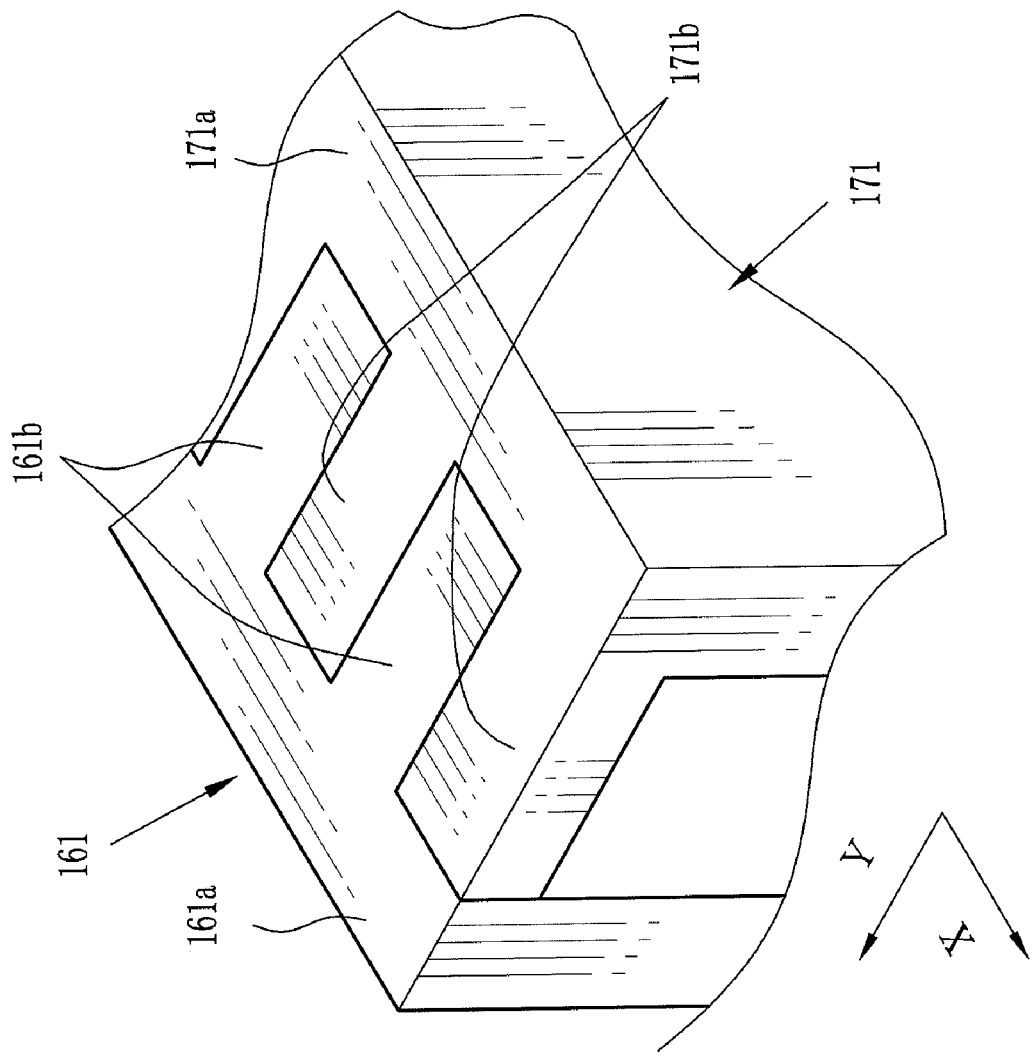

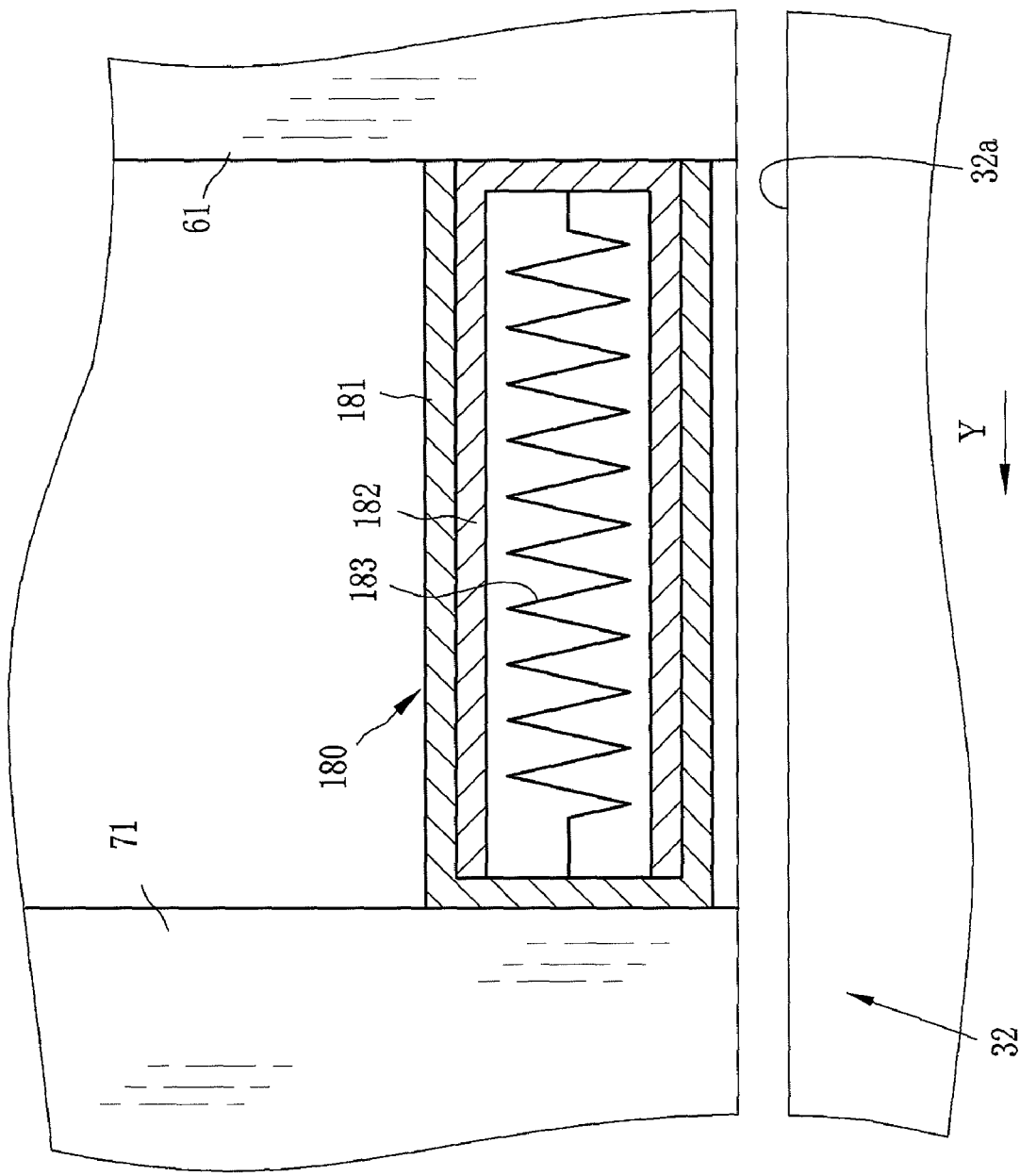

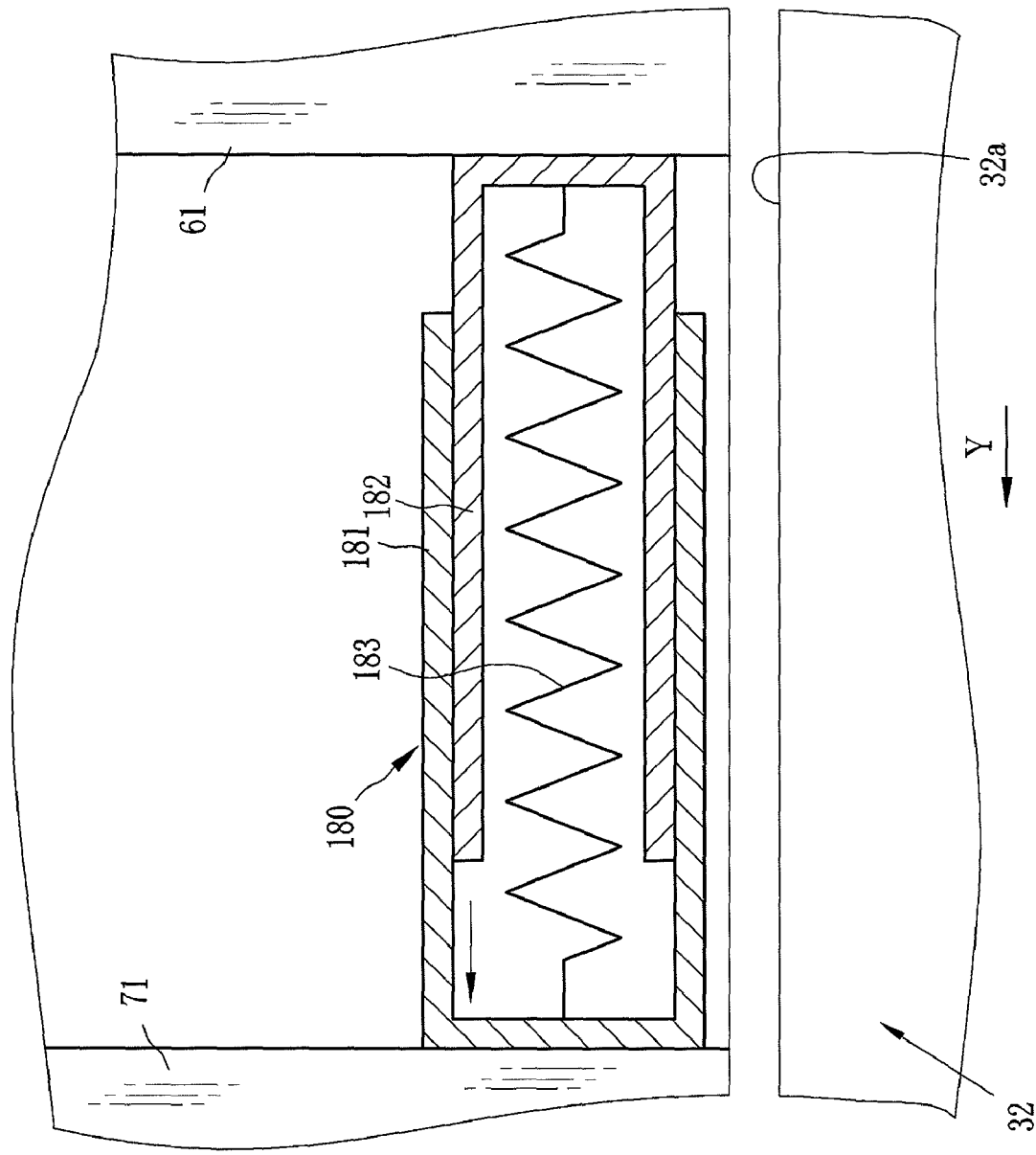

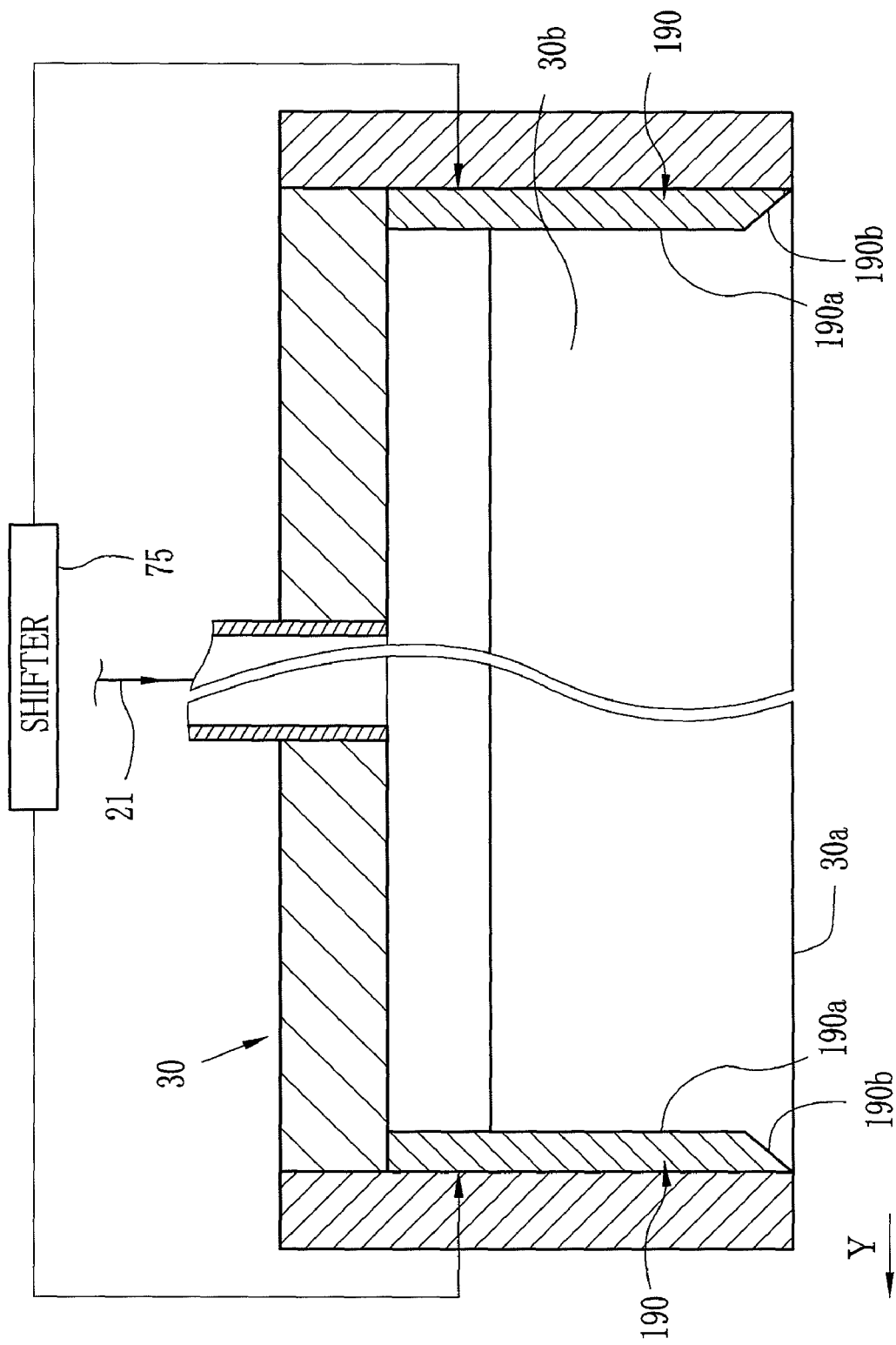

CASTING DEVICE, SOLUTION CASTING APPARATUS, AND CASTING METHOD

FIELD OF THE INVENTION

The present invention relates to a casting device, a solution casting apparatus, and a casting method.

BACKGROUND OF THE INVENTION

A polymer film (hereinafter referred to as film) has advantages such as excellent light transmission properties and flexibility. Accordingly, the film is widely used as an optical functional film. As a representative of the film, a cellulose ester film using cellulose acylate or the like has excellent toughness, and phase difference is small in the cellulose ester film. Therefore, the cellulose ester film is utilized as a base of photosensitive material. Additionally, the cellulose ester film is utilized as a protective film in a polarizing filter and an optical compensation film as components of a liquid crystal display (LCD) whose market is increasingly expanded recently.

As a film production method, mainly, there are a melt-extrusion method and a solution casting method. In the melt-extrusion method, a polymer is heated to be melted, and then extruded by an extruder, to form a film. The melt-extrusion method has advantages such as high productivity and relatively low equipment cost. However, in the melt-extrusion method, it is difficult to adjust the film thickness with high accuracy, and further fine streaks (die lines) easily occur on a surface of the film. Accordingly, it is difficult to produce a film having high quality as an optical functional film. On the contrary, in the solution casting film, a polymer solution containing a polymer and a solvent is cast onto a support to form a casting film. The casting film is hardened enough to be peeled and have a self-supporting property, and then peeled from the support to form a wet film. The wet film is dried to be a film. In the solution casting method, it is possible to obtain a film having more excellent optical isotropy and thickness evenness and containing less foreign substances in comparison with the melt-extrusion method. Therefore, the solution casting method is mainly adopted for a producing method of an optical functional film for use in the LCD or the like.

In the solution casting method, at first, a polymer such as triacetyl cellulose is dissolved into a mixed solvent containing dichloromethane or methyl acetate as a main solvent to prepare a polymer solution (hereinafter referred to as a dope). Then, a defined additive is mixed with the dope to prepare a casting dope. The casting dope is cast through a casting die onto a support such as a casting drum and an endless belt to form a casting film (hereinafter referred to as a casting process). The casting film is hardened enough to be peeled and have a self-supporting property on the support. Thereafter, the casting film is peeled as a wet film from the support. The wet film is dried and wound as a film.

Recently, in accordance with rapid increase in demand for the LCD and the like, a solution casting method having high production efficiency has been desired. In view of increasing the production efficiency, the speed at which the casting process is performed is slowest in the solution casting method. Therefore, for the purpose of speeding up the solution casting method, the moving speed of the support is made faster, and an upstream side from a casting bead in the moving direction of the support is decompressed by using a decompression means such as a decompression chamber. Note that, the casting bead is the casting dope extending from the casting die to the support.

During the casting process, when the clearance between the support and the decompression chamber is changed, the following problems occur in some cases. For example, in accordance with change in pressure inside the decompression chamber, a position of the support where the dope reaches is changed, and thereby thickness unevenness of the casting film occurs. Air enters between the casting film and the surface of the support in accordance with decrease in adhesion degree between the surface of the support and the casting bead. Accordingly, thickness unevenness of the film and defects on the surface of the film (surface undulation generated in the longitudinal and width directions of the film) occur. In view of the above, a film production apparatus as follows is disclosed in Japanese Patent Laid-Open Publication No. 2001-79864. In the film production apparatus, the clearance between the support and the decompression chamber is detected. When the clearance is less than a preset level, the decompression chamber is caused to move, to set the clearance between the support and the decompression chamber to the preset level or more.

Additionally, in a polymer film production method disclosed in Japanese Patent Laid-Open Publication No. 2002-103358, an air shielding plate or fin as an air shielding member is disposed at the vicinity of the casting die. In a cellulose ester film production apparatus disclosed in Japanese Patent Laid-Open Publication No. 2003-1655, the decompression chamber is provided with an adjustment plate as a labyrinth seal movable in a vertical direction, and in accordance with the vertical movement of the adjustment plate, the clearance between the adjustment plate and the surface of the support is adjusted.

Recently, in accordance with the variation in the usage of the film, it becomes necessary to produce films corresponding to each usage, namely the films whose material, thickness, and width are different from those of other films. According to the solution casting method for producing the films continuously as described above, when the film to be produced next has a different width, it is necessary to adjust not only a width of a discharge port for the dope in the casting die but also a width of an opening of the decompression chamber so as to correspond to the width of the casting bead. If the width of the opening is not adjusted in the solution casting method, flow of air at the vicinity of side ends of the casting bead causes vibration of the side ends of the casting bead. As a result, thickness unevenness and streaks occur on the film. Additionally, there is a limit for efficiently producing films having a width different from each other, because the casting device must be halted during the casting process for the purpose of adjusting the width of the opening.

According to the three patent documents described above, although it is possible to achieve a result at a certain level in view of preventing occurrence of thickness unevenness, still occurs thickness unevenness on the produced film. Accordingly, the three patent documents described above have a limit as a method for preventing occurrence of thickness unevenness.

SUMMARY OF THE INVENTION

In view of the above, an object of the present invention is to provide a casting device, a solution casting apparatus, and a casting method capable of efficiently producing a film.

In order to achieve the above and other objects, a casting device of the present invention includes a support moving continuously, a casting die, a decompression chamber, partition members, and a shift mechanism. The casting die is used for discharging a dope onto the support to form a casting film.

The decompression chamber is used for sucking air of an upstream area from a casting bead in a moving direction of the support to decompress the upstream area. The decompression chamber covers the support in an upstream side from the casting bead in the moving direction of the support. The casting bead is the casting dope extending from the casting die to the support. The partition members are disposed in the decompression chamber. Each of the partition members extends in the moving direction of the support. The shift mechanism is used for shifting at least one of the partition members.

The shift mechanism preferably includes a first shift section for shifting at least one of the partition members in the moving direction of the support. Each of the partition members is mounted to a mounting shaft. A longitudinal direction of the mounting shaft corresponds to a width direction of the casting bead. The shift mechanism preferably includes a rotational shift section for rotating at least one of the partition members around the mounting shaft. The shift mechanism preferably includes a second shift section for shifting at least one of the partition members in a normal direction of a surface of the support. The shift mechanism preferably includes a third shift section for shifting at least one of the partition members in the width direction of the casting bead.

The partition members preferably include a first side seal plate movable in the width direction of the casting bead and disposed in the upstream side from a side end of the casting bead in the moving direction of the support. The third shift section preferably has a seal plate shifter for shifting the first side seal plate in accordance with a position of the side end of the casting bead. Preferably, the casting device further includes a side air shielding unit disposed so as to block a clearance between the first side seal plate and a side board of the decompression chamber in the periphery of the support. The side air shielding unit has a width changeable in conjunction with change in a position of the first side seal plate. The partition members preferably include a second side seal plate disposed inward from the first side seal plate in the width direction of the casting bead. The seal plate shifter preferably shifts the second side seal plate in the width direction of the casting bead in conjunction with change in the position of the first side seal plate.

A solution casting apparatus of the present invention includes the casting device described above, and a drying device for drying the casting film peeled from the support to form a film.

According to a casting method of the present invention, a dope is discharged through a casting die onto a support moving continuously to form a casting film. A decompression chamber sucks air of an upstream area from a casting bead in the moving direction of the support to decompress the upstream area. The decompression chamber covers the support in an upstream side from the casting bead in the moving direction of the support. The casting bead is the casting dope extending from the casting die to the support. At least one of partition members disposed in the decompression chamber is shifted. Each of the partition members extends in the moving direction of the support.

At least one of the partition members is preferably shifted in the moving direction of the support. Each of the partition members is mounted to the mounting shaft. A longitudinal direction of the mounting shaft corresponds to a width direction of the casting bead. At least one of the partition members is preferably rotated around a mounting shaft. At least one of the partition members is preferably shifted in a normal direction of a surface of the support. At least one of the partition members is preferably shifted in the width direction of the casting bead.

The partition members preferably includes a first side seal plate movable in the width direction of the casting bead and disposed in the upstream side from a side end of the casting bead in the moving direction of the support. The first side seal plate is preferably shifted in accordance with a position of the side end of the casting bead. A side air shielding unit preferably blocks a clearance between the first side seal plate and a side board of the decompression chamber. The side air shielding unit is disposed in the periphery of the support and has a width changeable in conjunction with change in a position of the first side seal plate. A second side seal plate disposed inward from the first side seal plate in the width direction of the casting bead is preferably shifted in the width direction of the casting bead in conjunction with change in the position of the first side seal plate.

According to the present invention, the casting device includes the outer side seal plates for shielding air flowing from the side ends of the decompression chamber in the width direction, and the shift mechanism for shifting each of the outer side seal plates to a position corresponding to the side end of the casting bead in conjunction with change in the width of the casting bead. Therefore, even when the width of the casting bead is changed, it is possible to easily adjust the width of the opening of the decompression chamber during the operation of the casting device. Thus, according to the present invention, changeover of the films having different widths can be easily performed, and therefore films having different widths can be efficiently produced.

According to the present invention, since it is possible to shift the plural side seal plates for shielding air flowing from the side ends of the decompression chamber in the width direction to a position for stabilizing a shape of the casting bead, it is possible to prevent occurrence of thickness unevenness. Accordingly, according to the present invention, it is possible to efficiently produce films each having a uniform thickness.

DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 5 is a plan view of a portion surrounded by a chain double-dashed line V of FIG. 4 viewed from a peripheral surface of the casting drum, schematically illustrating an outer side seal plate and members around the outer side seal plate according to a first embodiment, wherein FIG. 5A illustrates a state before positioning of the outer side seal plate after a casting bead having a new width is formed, and FIG. 5B illustrates a state after positioning of the outer side seal plate in accordance with the casting bead having the new width;

FIG. 6 is a perspective view schematically illustrating an outer side seal plate, a side board, and members around them viewed from a peripheral surface of the casting drum according to a second embodiment, wherein FIG. 6A illustrates a state before positioning of the outer side seal plate after a casting bead having a new width is formed.

FIGS. 7A and 7B are cross sectional views schematically illustrating a side air shielding unit;

FIG. 8 is a cross sectional view taken along chain double-dashed lines VIII-VIII of FIG. 4, schematically illustrating the casting die;

DESCRIPTION OF THE PREFERRED EMBODIMENTS

Hereinafter, preferred embodiments of the present invention are described in detail. However, the present invention is not limited thereto.

Figure 1:
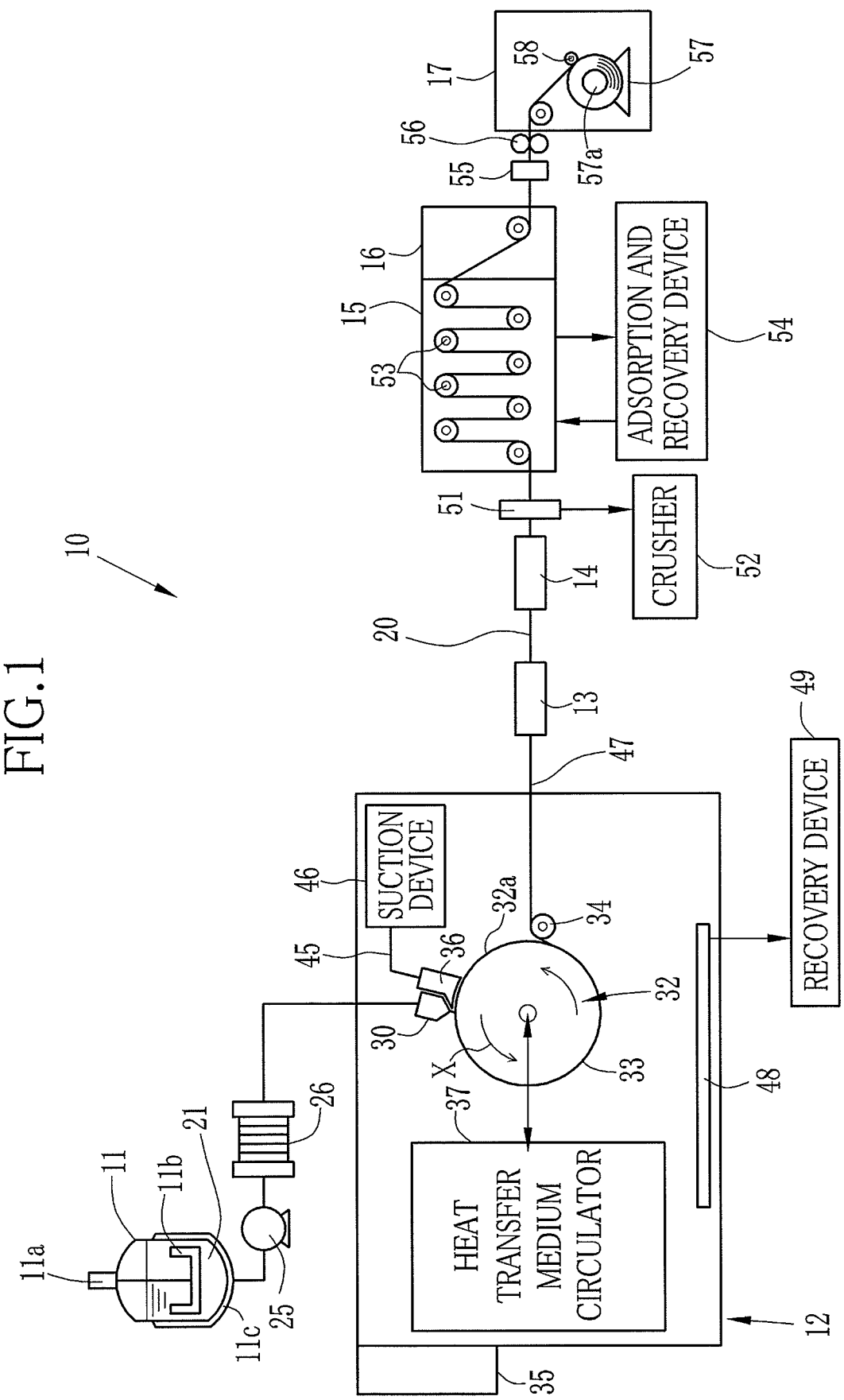
FIG. 1 is an explanatory view schematically illustrating a film production line.

As shown in FIG. 1, a film production line 10 includes a stock tank 11, a casting chamber 12, a pin tenter 13, a clip tenter 14, a drying chamber 15, a cooling chamber 16, and a winding chamber 17.

The stock tank 11 is provided with a stirrer blade 11b rotated by a motor 11a and a jacket 11c. Inside the stock tank 11 is stored a dope 21 as a raw material for a film 20. A heat transfer medium flows inside the jacket 11c of the stock tank 11 such that a temperature of the dope 21 is adjusted to be within the range of 25° C. to 35° C. Since the stirrer blade 11b is rotated by the motor 11a in the stock tank 11, it is possible to keep the dope 21 in a constant state while preventing aggregation of a polymer and the like.

A pump 25 and a filtration device 26 are disposed in a downstream side from the stock tank 11. An adequate amount of the dope 21 is arbitrarily poured into the filtration device 26 from the stock tank 11 by use of the pump 25, and filtered by the filtration device 26. Thereby, impurities are removed from the dope 21.

The casting chamber 12 includes a casting die 30, a casting drum 32, a peeling roller 34, a temperature adjuster 35, and a decompression chamber 36 so as to constitute a casting device. The casting die 30 is used as a means for casting the dope 21. The casting drum 32 is an endless support. The peeling roller 34 is used to peel a casting film 33 from the casting drum 32. The temperature adjuster 35 adjusts the temperature inside the casting chamber 12. The decompression chamber 36 is used as a decompression means.

Figure 2:
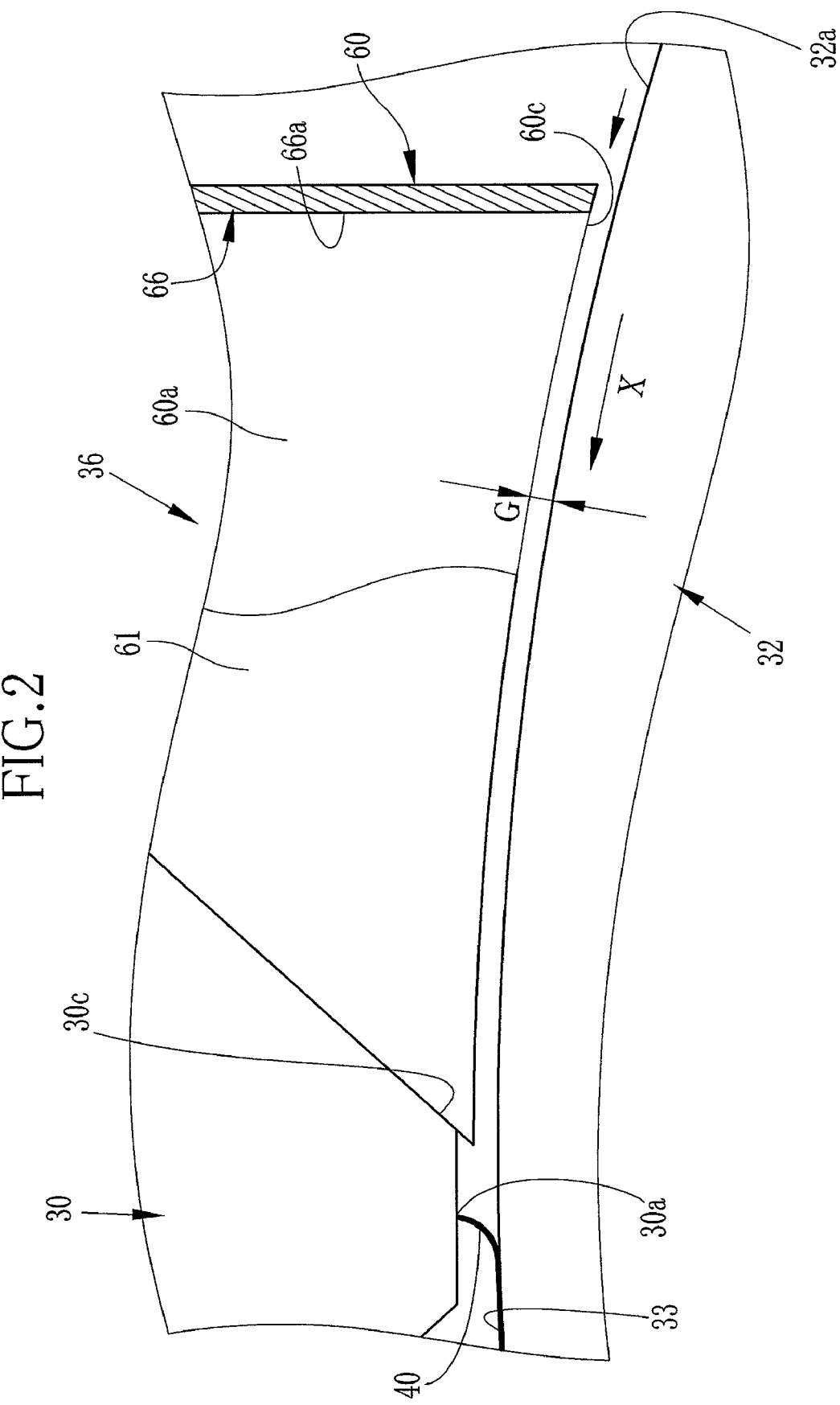
FIG. 2 is an explanatory view schematically illustrating a casting die, a casting drum, and a decompression chamber.

As shown in FIG. 2, a discharge port 30a is provided at a front end of the casting die 30. The dope 21 (see FIG. 1) is cast through the discharge port 30a onto a peripheral surface 32a of the casting drum 32 disposed below the discharge port 30a. A material for the casting die 30 has high resistance to corrosion against an electrolyte aqueous solution, and a mixed liquid of methylene chloride, methanol, and the like. A coefficient of thermal expansion of the material for the casting die 30 is low. Accuracy of finishing of a contact surface of the casting die 30 to the liquid is preferably 1 μm or less in the surface roughness, and straightness thereof is preferably 1 μm/m or less in any direction. The casting die 30 as described above is used to form the casting film 33 having no streaks and thickness unevenness on the peripheral surface 32a of the casting drum 32.

As shown in FIGS. 1 and 2, the casting drum 32 is a cylinder that is rotated by a not-shown driver around a shaft. The not-shown driver causes the casting drum 32 to rotate such that the peripheral surface 32a of the casting drum 32 moves in a predetermined moving direction (hereinafter referred to as X direction) at a predetermined moving speed within the range of 10 to 300 m/min. The peripheral surface 32a of the casting drum 32 is subjected to chrome plating so as to have sufficient resistance to corrosion and strength. A heat transfer medium circulator 37 is attached to the casting drum 32. The temperature of the heat transfer medium is kept at a desired value by the heat transfer medium circulator 37. The heat transfer medium flows inside a heat transfer medium passage in the casting drum 32 such that a surface temperature of the casting drum 32 is kept within a desired range.

During a casting process, the dope 21 is cast through the discharge port 30a of the casting die 30 onto the peripheral surface 32a of the casting drum 32 such that a casting bead 40 extending from the discharge port 30a to the peripheral surface 32a is formed. The dope 21 cast onto the moving peripheral surface 32a spreads thereon so as to form the casting film 33. The casting film 33 is conveyed in the X direction at a predetermined speed in accordance with the rotation of the casting drum 32. As described above, the dope 21 is continuously cast onto the moving peripheral surface 32a of the casting drum 32 so as to form the long casting film 33 on the peripheral surface 32a.

The decompression chamber 36 is disposed in an upstream side from the casting die 30 in the X direction, and connected to a suction device 46 through a pipe 45. The decompression chamber 36 sucks air of a cavity 60a of the decompression chamber 36 by the suction device 46, and as a result, the upstream side from the casting bead 40 is decompressed such that the pressure in the upstream side from the casting bead 40 in the X direction is lower than that in the downstream side by 10 Pa to 1500 Pa. As shown in FIG. 1, in accordance with the decompression, degree of adhesion between the peripheral surface 32a and the casting bead 40 is increased, and therefore it is possible to prevent air from entering between the casting film 33 and the peripheral surface 32a. The casting film 33 is cooled on the casting drum 32 so as to be hardened enough to have a self-supporting property. Thereafter, the casting film 33 is peeled from the casting drum 32 by use of the peeling roller 34 to be a wet film 47.

The temperature inside the casting chamber 12 is adjusted to be approximately constant within a predetermined range by the temperature adjuster 35. The temperature inside the casting chamber 12 is preferably in the range of 10° C. to 30° C. Inside the casting chamber 12 is provided a condenser 48, and outside the casting chamber 12 is provided a recovery device 49. The solvent vapor in the casting chamber 12 is condensed into liquid by the condenser 48, and further recovered by the recovery device 49. The liquid is refined by a refining device to be reused as an organic solvent for preparing the dope. A condensation point of the solvent in the casting chamber 12 is kept within the range of −10° C. to 25° C. In a case where the condensation point of the solvent in the casting chamber 12 is less than −10° C., the solvent easily evaporates. Therefore, plate out easily occurs, unfavorably. Note that the plate out means precipitation of some undesired substances on the peripheral surface 32a. In contrast, in a case where the condensation point of the solvent in the casting chamber 12 exceeds 25° C., condensation of the solvent easily occurs on the peripheral surface 32a. The condensation of the solvent causes defect on the surface of the film, unfavorably. Note that, the condensation point means a temperature at which condensation of the solvent contained in the atmosphere starts upon cooling.

The pin tenter 13 and the clip tenter 14 are disposed in the downstream side from the casting chamber 12. The pin tenter 13 is used to dry the wet film 47 to form the film 20. The clip tenter 14 is used to stretch the film 20 while drying the film 20. In the pin tenter 13, plural pins are inserted into the side ends of the wet film 47 and fixed thereto. While being conveyed in the pin tenter 13, the wet film 47 is dried to be the film 20. The film 20 still containing the solvent is sent to the clip tenter 14.

In the clip tenter 14, side ends of the film 20 are held by plural clips moving continuously in accordance with the moving chain. Thereafter, while being conveyed in the clip tenter 14, the film 20 is dried. The distance between the clips opposed to each other in the width direction of the film 20 is increased so as to apply tension to the width direction of the film 20. Thereby, the film 20 is stretched. As described above, since the film 20 is stretched in the width direction, molecules in the film 20 are orientated, and thereby the film 20 comes to have desired optical properties such as retardation. Note that the clip tenter 14 may be omitted.

The side ends of the film 20 sent from the clip tenter 14 is cut off by an edge slitting device 51. The edge slitting device 51 is provided with a crusher 52. After being cut away, the side ends of the film 20 are sent to the crusher 52 to be crushed into pieces. The pieces of film 20 thus crushed are reused as a primary dope.

The film 20 whose side ends are cut off by the edge slitting device 51 is sent to the drying chamber 15. The drying chamber 15 includes plural rollers 53 and an adsorption and recovery device 54. The film 20 is conveyed by the rollers 53 in the drying chamber 15. The film 20 dried in the drying chamber 15 is sent to the cooling chamber 16 to be cooled therein such that the temperature of the film 20 goes down to at least 30° C. Then, the film 20 is sent to the winding chamber 17. Additionally, a compulsory neutralization device (neutralization bar) 55 is disposed in the downstream side from the cooling chamber 16 next to the drying chamber 15. Moreover, a knurling roller 56 is disposed in the downstream side from the neutralization device 55 in this embodiment.

The winding chamber 17 contains a winder 57 and a press roller 58. The film 20 sent to the winding chamber 17 is wound around the core 57a rotated by the winder 57 while being pressed against the core 57a by the press roller 58.

Figure 3:
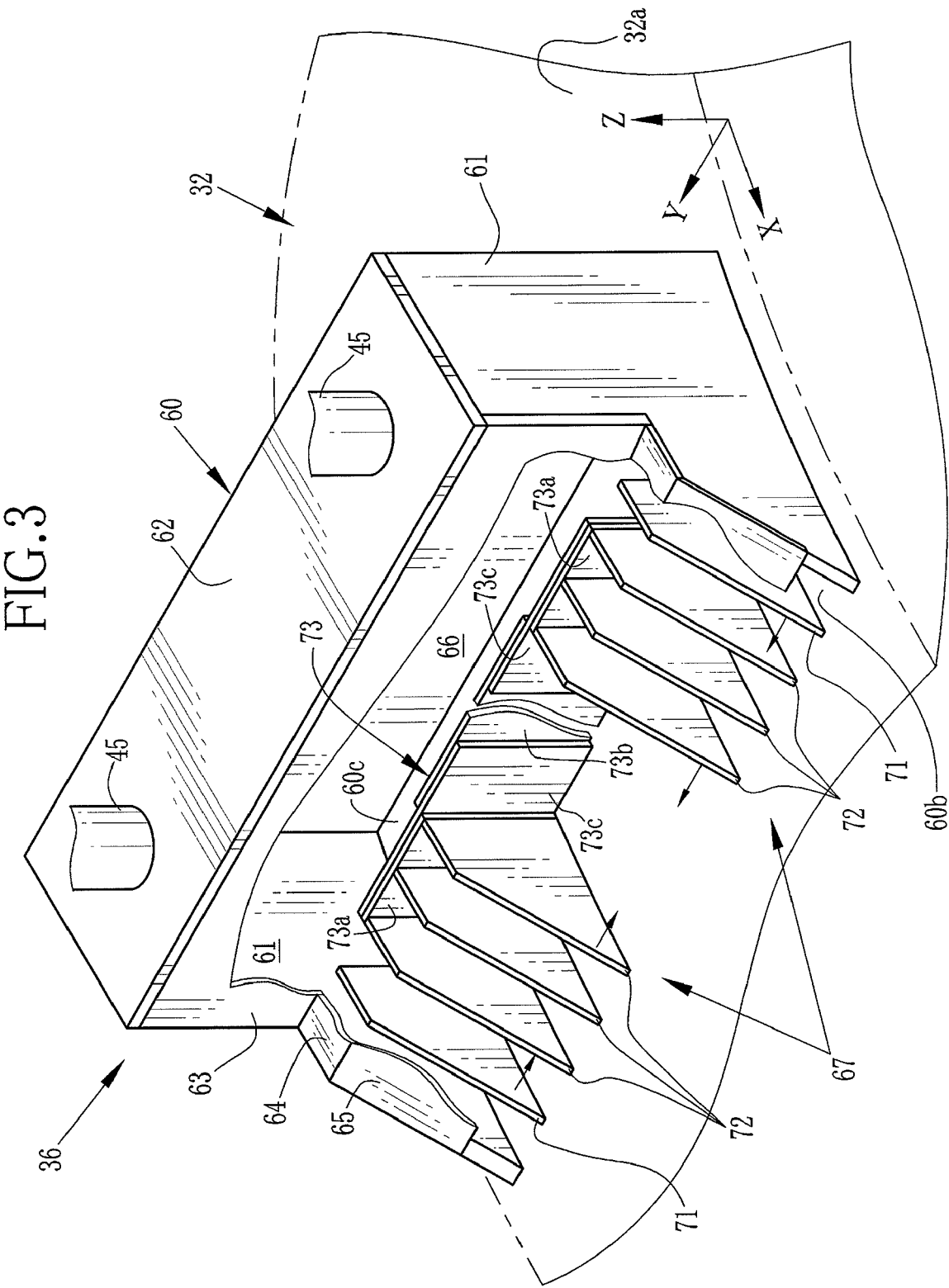
FIG. 3 is an exploded perspective view schematically illustrating the decompression chamber.

Next, the decompression chamber 36 is described in detail hereinbelow. As shown in FIG. 3, the decompression chamber 36 is constituted by a casing 60. The casing 60 is made by a pair of side boards 61 disposed along the X direction, a top board 62 bridged over the pair of side boards 61, a first front board 63, a second front board 64, a third front board 65, and a rear board 66 so as to form the cavity 60a (see FIG. 2) in the casing 60. Note that the casing 60 is disposed such that the end of each of the side boards 61 and the rear boards 66 is close to the peripheral surface 32a. The casing 60 has a front opening 60b partially or fully blocked by a front end 30c of the casting die 30 at its front side in the downstream side in the X direction. At the bottom of the casing 60 is provided a bottom opening 60c so as to be close to the peripheral surface 32a of the casting drum 32. Note that as long as the casting die 30 can block the front opening 60b, the third front board 65 may be omitted.

Figure 4:
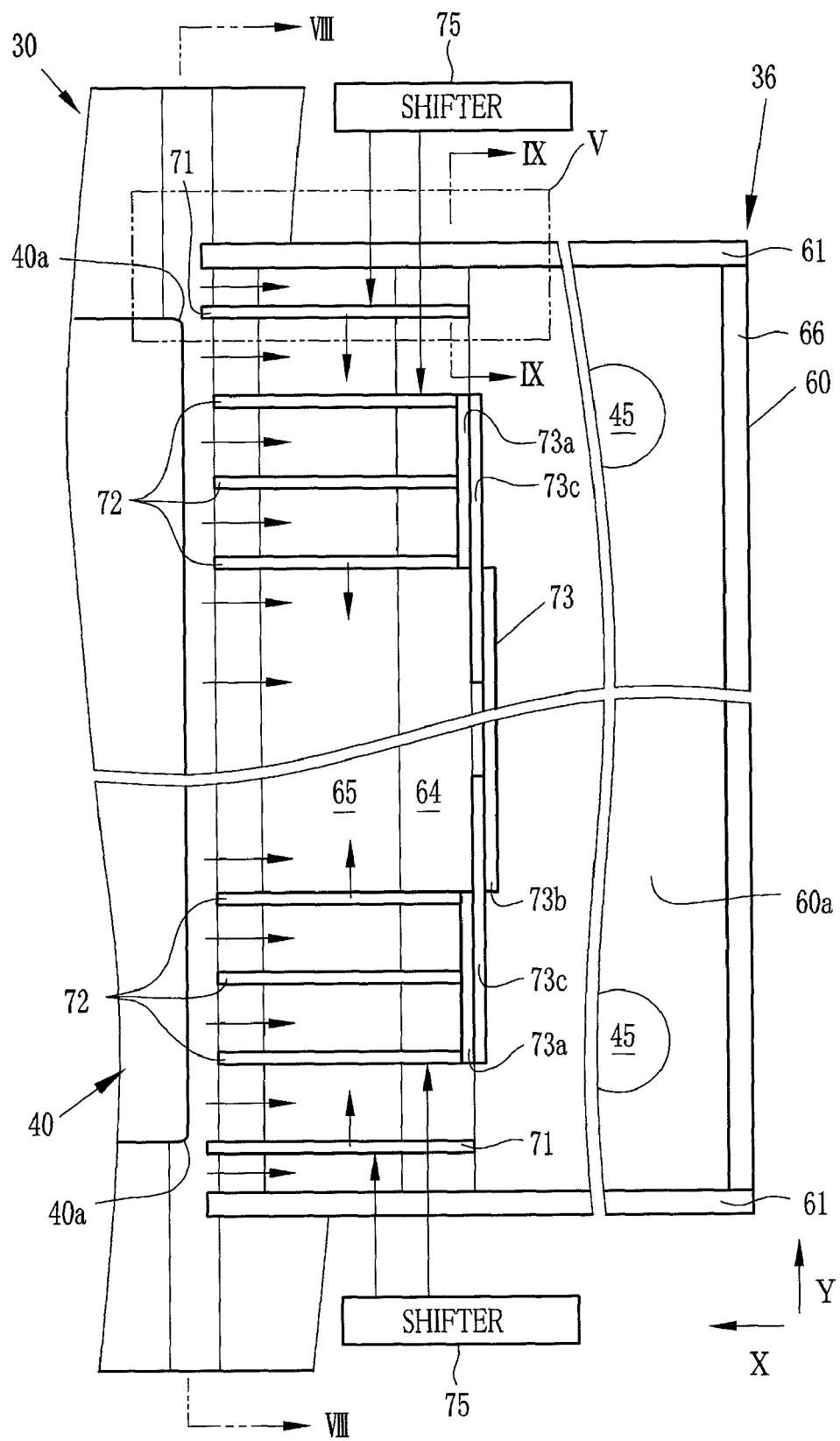
FIG. 4 is a plan view schematically illustrating the decompression chamber viewed from a peripheral surface of the casting drum.

As shown in FIGS. 3 and 4, plural partition members 67 are disposed so as to stand upright along the X direction in the casing 60. The plural partition members 67 divide the inside of the casing 60 into plural sections in a width direction of the casing bead 40 (hereinafter referred to as Y direction). The partition members 67 function as flow regulating plates for air flowing due to the suction of the decompression chamber 36. Among the plural partition members 67, the member disposed in the upstream side from each side end 40a of the casting bead 40 in the X direction are referred to as outer side seal plates 71, and the members disposed between the pair of outer side seal plates 71 are referred to as inner side seal plates 72.

A lateral seal plate 73 extending along the Y direction is disposed at the end of the inner side seal plates 72 in the upstream side in the X direction. The lateral seal plate 73 consists of fixed parts 73a fixed to the inner side seal plates 72, a mounting part 73b for mounting the inner side seal plates 72 to the casing 60, and movable parts 73c slidable in the Y direction between the fixed parts 73a and the mounting part 73b. When the movable parts 73c slide in the Y direction, the inner side seal plates 72 also slide in the Y direction together with the fixed parts 73a. Note that each of the fixed parts 73a, the mounting part 73b, and the movable parts 73c is a plate. As shown in FIG. 4, the pair of outer side seal plates 71 and the inner side seal plates 72 are connected to a shifter 75. The shifter 75 consists of, for example, female screws provided at each of the outer side seal plates 71 and the inner side seal plates 72, and threaded rods screwed into the female screws. The threaded rods are driven to rotate by a motor (not shown) from the outside of the casing 60 so as to slide the inner side seal plates 72 and the outer side seal plates 71 in the Y direction. Each of the seal plates 71 to 73 is preferably made of, for example, MC nylon (registered trademark) or Teflon (registered trademark) that is not easily dissolved into the organic solvent.

Next, an operation of the film production line 10 having the above-described structure is described. As shown in FIGS. 1 and 2, the casting drum 32 is rotated around a center of its cross section as a shaft such that the peripheral surface 32a thereof moves in the X direction. The dope 21 is cast through the discharge port 30a onto the peripheral surface 32a to form the casting bead 40 extending from the discharge port 30a to the peripheral surface 32a. The suction device 46 sucks air of the cavity 60a of the decompression chamber 36. Due to the suction, the air in the upstream side from the casting bead 40 flows toward the cavity 60a.

As shown in FIGS. 2 to 4, a control section causes the pair of outer side seal plates 71 and the inner side seal plates 72 to move in the Y direction based on the predetermined width of the casting bead 40. Thereby, the pair of outer side seal plates 71 are located in the upstream side from the side ends 40a of the casting bead 40 in the X direction such that a seal clearance G between the pair of outer side seal plates 71 and the peripheral surface 32a are kept constant. Since air does not easily flows into the decompression chamber 36 through the clearance between the side ends 40a of the casting bead 40 and the front opening 60b of the decompression chamber 36, excellent airtightness can be maintained at the vicinity of the side ends 40a.

As shown in FIG. 5A, upon the formation of the casting bead 40 having a new width such that the position of each of the side ends 40a changes from a position shown by a chain double-dashed line to a position shown by a solid line in the drawing, the control section causes the shifter 75 to move the pair of outer side seal plates 71 and the inner side seal plates 72 in the Y direction based on the predetermined width of the casting bead 40 newly formed. Since each of the side seal plates 71 and 72 are caused to move in parallel by a not-shown guide mechanism, the seal clearance G (shown in FIG. 2) can be maintained constant. Thereby, the pair of outer side seal plates 71 is located in the upstream side from the side ends 40*a* of the casting bead 40 having the new width in the X direction (see FIG. 5B).

According to the present invention, it is possible to move the outer side seal plates 71 in the Y direction in the upstream side from each of the side ends 40*a* in the X direction during the casting process even if the width of the casting bead 40 is changed. Therefore, excellent airtightness can be maintained also at the vicinity of the side ends 40*a* of the casting bead 40 having the new width. Additionally, according to the present invention, in accordance with the movement of the outer side seal plates 71, the inner side seal plates 72 are caused to move in the Y direction. Therefore, flow regulating effect can be increased at the vicinity of the side ends 40*a*, and as a result, it is possible to prevent occurrence of thickness unevenness of the film. Thus, according to the present invention, since it is possible to prevent vibration of the side ends 40*a* resulting from flow of air at the vicinity of the side ends 40*a* during the casting process, occurrence of thickness unevenness and streaks on the film can be prevented. Thereby, it is possible to efficiently produce the films having a width different from each other.

Although the outer side seal plates 71 are caused to move in the Y direction such that an inner surface 71*a* of each of the outer side seal plates 71 is located in the upstream side from the side ends 40 in the X direction as shown in FIG. 5B, the present invention is not limited thereto. It is also possible to cause the outer side seal plates 71 to move in the Y direction, such that, instead of the inner surface 71*a*, an outer surface 71*b* of each of the outer side seal plates 71 or a portion between the inner surface 71*a* and the outer surface 71*b* is located in the upstream side from the side ends 40*a* in the X direction.

Although the outer side seal plates 71 are caused to move based on the predetermined width of the casting bead 40 in the above embodiment, the present invention is not limited thereto. Alternatively, it is also possible to provide a projector for applying light toward the casting bead 40 in the downstream side from the casting bead 40 in the X direction, and a sensor unit for detecting light applied from the projector at the end of each of the outer side seal plates 71 in the X direction. When the sensor unit detects the light applied from the projector, each of the outer side seal plates 71 is caused to move outward, namely, toward the side end 40*a* of the casting bead 40 in the Y direction. When the sensor unit detects no light applied from the projector, each of the outer side seal plates 71 is caused to move inward, namely, toward a center part of the casting bead 40 in the Y direction. Accordingly, it is possible to position the outer side seal plates 71. Additionally, an infrared-sensitive digital camera or the like is used to capture an image of the casting bead 40 or the casting film. The obtained image data is subjected to a predetermined image processing. The position of each of the side ends of the casting bead 40 is detected by the imaging process. Based on the position of each of the side ends of the casting bead 40, the width of the casting bead 40 is obtained. Then, it is possible to position the outer side seal plates 71 based on the obtained width of the casting bead 40.

Although the pair of outer side seal plates 71 and the inner side seal plates 72 are caused to move in the Y direction in the above embodiment, the present invention is not limited thereto. The pair of outer side seal plates 71 and the inner side seal plates 72 may be caused to move in the Y direction separately. In this case, the pair of outer side seal plates 71 may be caused to move toward the upstream side from the side ends 40*a* in the X direction as in the case of the above embodiment, and each of the inner side seal plates 72 may be caused to move to a position in which flow regulating effect can be exerted at the side ends 40*a*.

Although the lateral seal plate 73 including the parts 71*a* to 73*c* is used in the above embodiment, the present invention is not limited thereto. In a case where the inner side seal plates 72 are not caused to move in the Y direction, the lateral seal plate 73 may be constituted by one seal plate instead of the parts 73*a* to 73*c*.

Figure 6B:
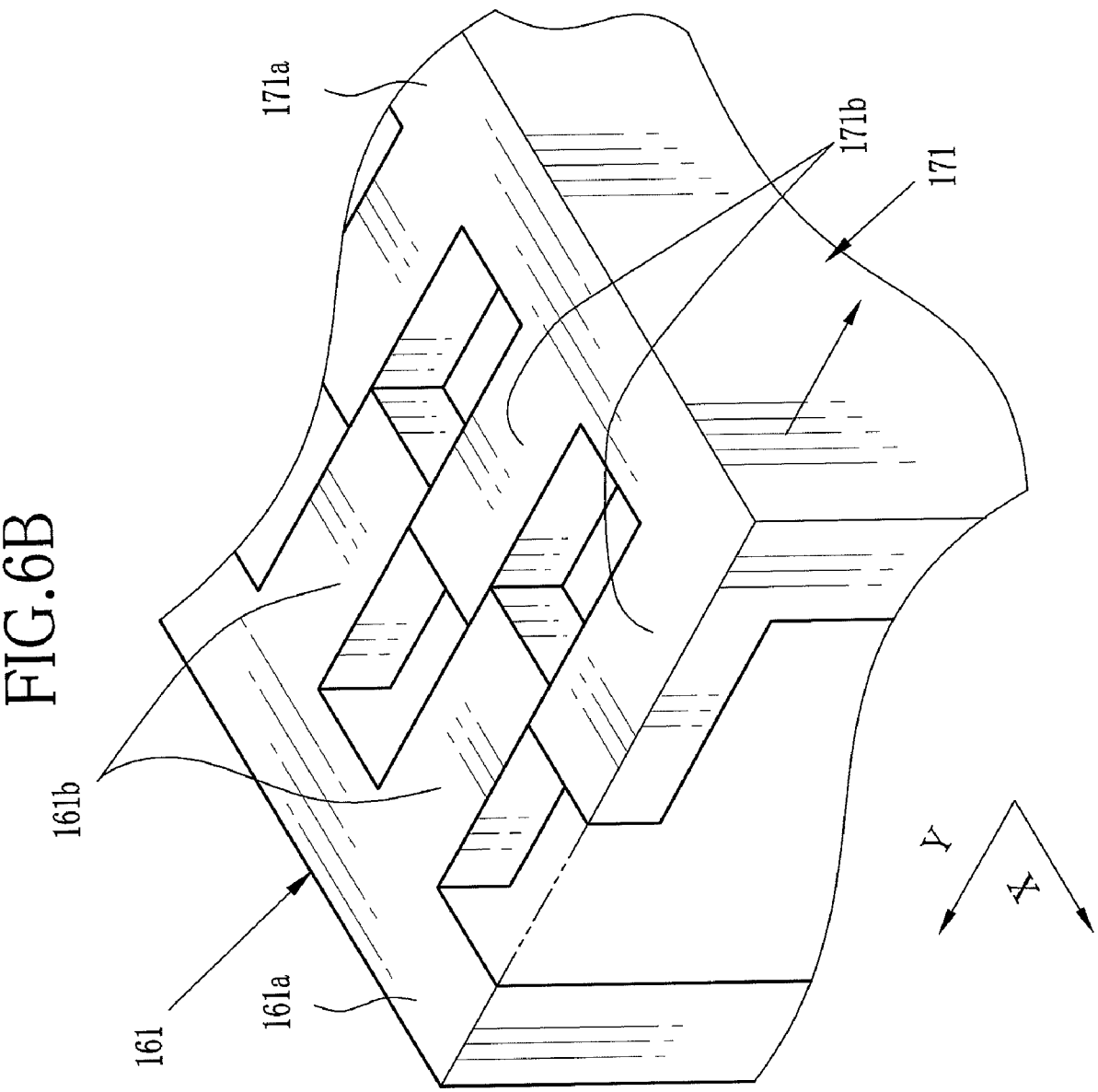
FIG. 6B illustrates a state after positioning of the outer side seal plate in accordance with the casting bead having the new width.

It is also possible to provide a side air shielding unit in the periphery of the peripheral surface 32*a* in each of the clearances between the outer side seal plate 71 and the side board 61 in the above embodiment. As shown in FIG. 6A, the outer side seal plate 171 consists of a panel 171*a* and protrusions 171*b* as the side air shielding unit, and a side board 161 consists of a panel 161*a* and protrusions 161*b* as the side air shielding unit. The protrusions 171*b* are provided at the panel 171*a* so as to extend toward the panel 161*a* in the Y direction. The protrusions 161*b* are provided at the panel 161*a* so as to extend toward the panel 171*a* in the Y direction. The shift mechanism is used to move the outer side seal plate 171 in the Y direction such that the protrusions 171*b* and 161*b* block the clearance between the outer side seal plate 171 and the side board 161 from the downstream side in the X direction. Further, as in the case of the above embodiment, the outer side seal plate 171 is caused to move in the Y direction such that the panel 171*a* is located in the upstream side from the side end 40*a* in the X direction (see FIG. 6B). Due to the movement of the outer side seal plate 171 and the side board 161 in the Y direction, it is possible to shield flow of air not only in the clearance between the side end 40*a* and the front opening 60*b* but also in the clearance between the outer side seal plate 171 and the sideboard 161. Accordingly, the outer side seal plate 171 and the side board 161 make it possible to increase airtightness at the vicinity of the side end 40*a*.

Note that although each of the number of the protrusions 171*b* provided at the panel 171*a* and the number of the protrusions 161*b* provided at the panel 161*a* is three in the above embodiment, the present invention is not limited thereto. The number thereof may be one, two, or four or more.

Further, a side air shielding unit 180 may be provided in the periphery of the peripheral surface 32*a* in each of the clearances between the outer side seal plate 71 and the side board 61. As shown in FIG. 7A, the side air shielding unit 180 consists of a lid 181, a box 182, and a biasing member 183. The box 182 has an opening. The lid 181 is disposed so as to close the opening of the box 182. The biasing member 183 is disposed in the box 182. The biasing member 183 biases the lid 181 such that the width of the side air shielding unit 180 becomes longer in the Y direction. As in the case of the above embodiment, when the outer side seal plate 71 is caused to move in the Y direction based on the predetermined width of the casting bead 40*a*, as shown in FIG. 7B, in accordance with change in the clearance between the outer side seal plate 71 and the side board 61 due to the movement of the outer side seal plate 71, the width of the side air shielding unit 180 changes in the Y direction. As a result, it is possible to block the clearance between the outer side seal plate 71 and the side board 61 from the downstream side in the X direction. Thus, the side air shielding unit 180 makes it possible to shield flow of air not only in the clearance between the side end 40*a* and the front opening 60*b* but also in the clearance between the outer side seal plate 71 and the side board 61.

Although the outer side seal plates 71 are caused to move in the Y direction based on the predetermined width of the casting bead 40*a* in the above embodiment, the present invention is not limited thereto. It is also possible to move each of the outer side seal plates 71 in the Y direction based on the position of inner deckle plates of the casting die 30 in the Y direction.

As shown in FIG. 8, the casting die 30 has a flow channel 30b communicated with a discharge port 30a. One pair of inner deckle plates 190 is provided such that one of them is located at one end of the flow channel 30b and the other of them is located at the other end thereof in the Y direction. The width of each of the flow channel 30b and the discharge port 30a in the Y direction is determined in accordance with a distance between liquid-contact surfaces 190a of the pair of inner deckle plate 190 and a distance between splayed surfaces 190b of the pair of inner deckle plate 190. The pair of inner deckle plates 190 is connected to the shifter 75 and movable in the Y direction. The dope 21 is supplied to the flow channel 30b such that the casting bead 40 is formed so as to extend from the discharge port 30a to the peripheral surface 32a. The width of the casting bead 40 is determined based on the distance between the pair of liquid-contact surfaces 190a and the distance between the pair of splayed surfaces 190b (see FIG. 4). The not-shown control section can control the shifter 75 so as to position the pair of inner deckle plates 190 in the Y direction. Therefore, the pair of outer side seal plates 71 is caused to move in the Y direction based on the position of the pair of inner deckle plates 190 such that the pair of outer side seal plates 71 is located in the upstream side from the side ends 40a of the casting bead 40 in the X direction.

Figure 9:
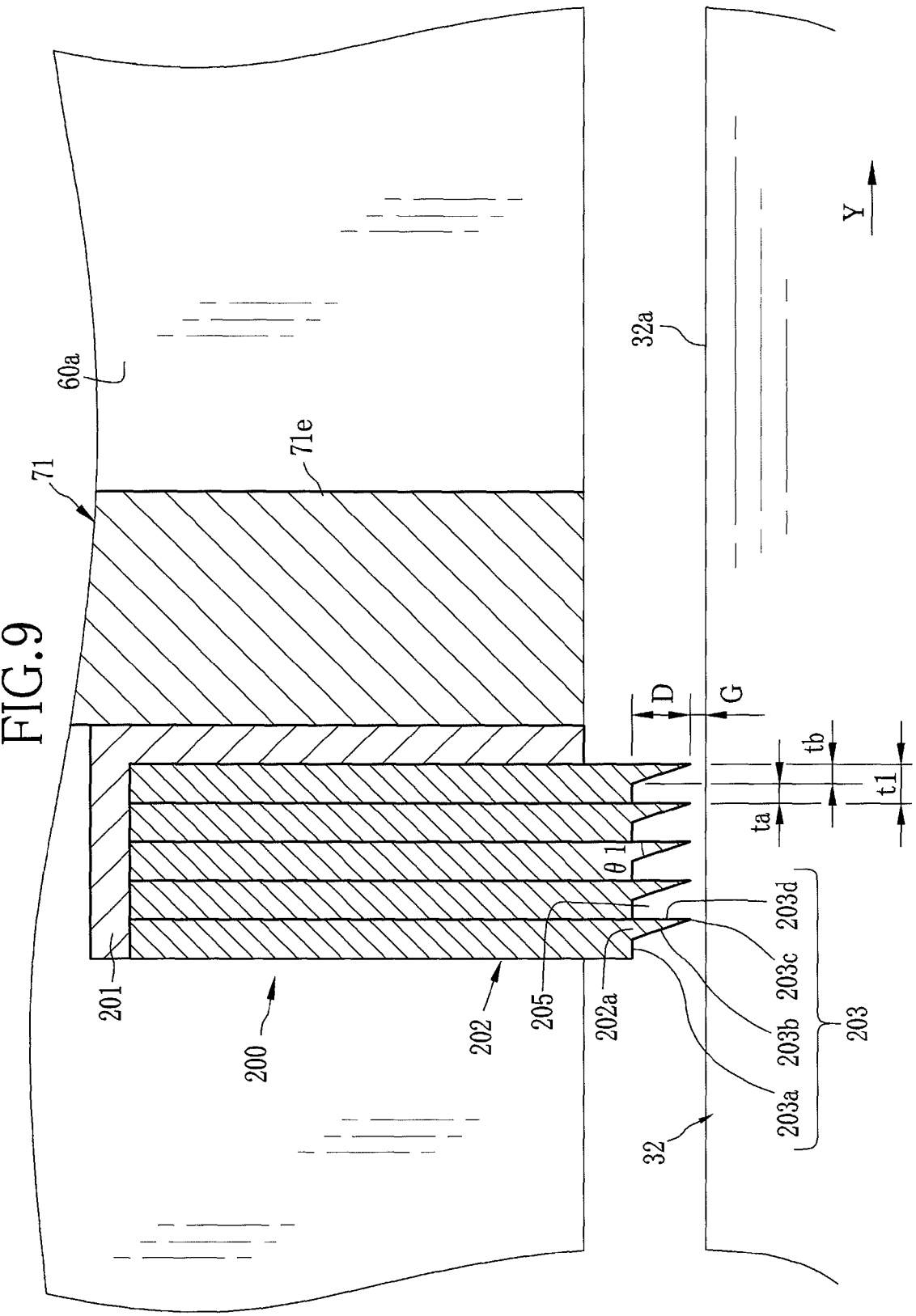
FIG. 9 is a cross sectional view taken along chain double-dashed lines IX-IX of FIG. 4, schematically illustrating an outer side seal plate and members around the outer side seal plate according to a third embodiment.

A labyrinth seal may be provided at a lower end portion of the outer side seal plate 71. As shown in FIG. 9, a labyrinth seal 200 is fixed to an end portion 71e of the outer side seal plate 71 through a bracket 201. The labyrinth seal 200 consists of five seal members 202 arranged so as to be in close contact with each other in the Y direction. The seal members 202 are preferably made of MC nylon (registered trademark) and Teflon (registered trademark) that is not easily dissolved into the organic solvent. Each of the seal members 202 is disposed along the X direction and vertical to the peripheral surface 32a, such that an end portion 202a of each of the seal members 202 is close to the peripheral surface 32a. A groove forming portion 203 is formed at the end portion 202a so as to extend along the X direction.

The groove forming portion 203 is composed of a bottom surface 203a, an inclined surface 203b, an edge portion 203c, and a vertical surface 203d disposed in this order from the center to the side in the Y direction. A clearance between the bottom surface 203a and the peripheral surface 32a is approximately constant along the X and Y directions. A clearance between the inclined surface 203b and the peripheral surface 32a is gradually decreased from the center to the side in the Y direction in the cavity 60a. The edge portion 203c is defined by the inclined surface 203b and the vertical surface 203d. The edge portion 203c has a cross section with an acute tip angle θ1 in a direction of the flowing air. The tip angle θ1 is preferably in the range of 20° to 60°, and more preferably in the range of 30° to 50°. An area of the cross section of the groove forming portion 203 in a direction of the flowing air is preferably in the range of 300 to 1500 mm$^2$, and more preferably in the range of 700 to 1000 mm$^2$. The seal members 202 each having the groove forming portion 203 at its end portion 202a are arranged so as to be in close contact with each other in the Y direction, and thereby labyrinth grooves 205 are formed along the X direction at the end portion of the outer side seal plate 71 in the periphery of the peripheral surface 32a. Note that the labyrinth seal 200 described above may be disposed at the end portion of the side boards 61, the rear board 66, the inner side seal plates 72, or the parts 73a to 73c in the periphery of the peripheral surface 32a. Thereby, it is possible to increase airtightness at the vicinity of the side ends 40a of the casting bead 40. Note that the labyrinth seal 200 may be disposed at not only the end portion of the outer side seal plate 71 solely but also an end portion of the pair of side boards 61. Alternatively, the labyrinth seal 200 may be disposed at the end portion of the pair of side boards 61. Note that the lines V-V of FIG. 4 correspond to the direction of flowing air.

The edge portion 203c may have any shape as long as it can compress the air passing through the clearance between the edge portion 203c and the peripheral surface 32a. Each of the inclined surface 203b, the bottom surface 203a, and the vertical surface 203d of the labyrinth groove 205 may have any shape as long as the flowing air passing through the clearance between the edge portion 203c and the peripheral surface 32a can be swollen in the labyrinth groove 205, and more preferably the inclined surface 203b has a shape allowing the air just after having passed through the clearance between the edge portion 203c and the peripheral surface 32a to be swollen. A depth D of the labyrinth groove 205, which is obtained by subtracting a seal clearance G from a clearance between the bottom surface 203a and the peripheral surface 32a, is preferably gradually increased toward the bottom opening 60c.

The labyrinth seal 200 is preferably attached to the decompression chamber 36 such that the seal clearance G between the edge portion 203c and the peripheral surface 32a is within the range of 0.1 to 5 mm. Further the seal clearance G is more preferably within the range of 0.3 to 2 mm. In a case where the labyrinth seal 200 has plural edge portions 203c, the smallest clearance between the edge portion 203c and the peripheral surface 32a among the plural clearances may be considered as the seal clearance G. A thickness t1 of the seal member 202 is preferably within the range of 1 to 20 mm. Further, it is preferable that a width ta of the bottom surface 203a in the Y direction is within the range of 1 to 20 mm, a width tb of the inclined surface 203b in the Y direction is within the range of 0.1 to 1 mm, and the depth D of the labyrinth groove 205 is within the range of 1 to 10 mm.

As the width of the film 22 to be produced is increased, the width of the casting film is also increased. As a result, vibration of the side ends 40a of the casting bead 40 easily occurs. According to the casting device of the present invention, even if the width of the casting film is increased, excellent airtightness can be maintained at the vicinity of the side ends 40a of the casting bead 40. The width of the casting film is preferably at least 600 mm, and more preferably in the range of 1400 to 2500 mm, for example. Additionally, in a case where the width of the casting film is more than 2500 mm, the present invention is effective.

Next, according to another embodiment, a partition member is caused to shift in the X, Y, and Z directions and rotate around a rotation shaft provided along the Y direction. Accordingly, the partition member can be set at an appropriate position in the decompression chamber. Here, the Z direction is perpendicular to a plane defined by the X and Y directions (see FIG. 3). Note that the partition member of this embodiment may be movable in the Y direction as in the case of the above embodiment, or may be fixed along the Y direction.

Figure 10:
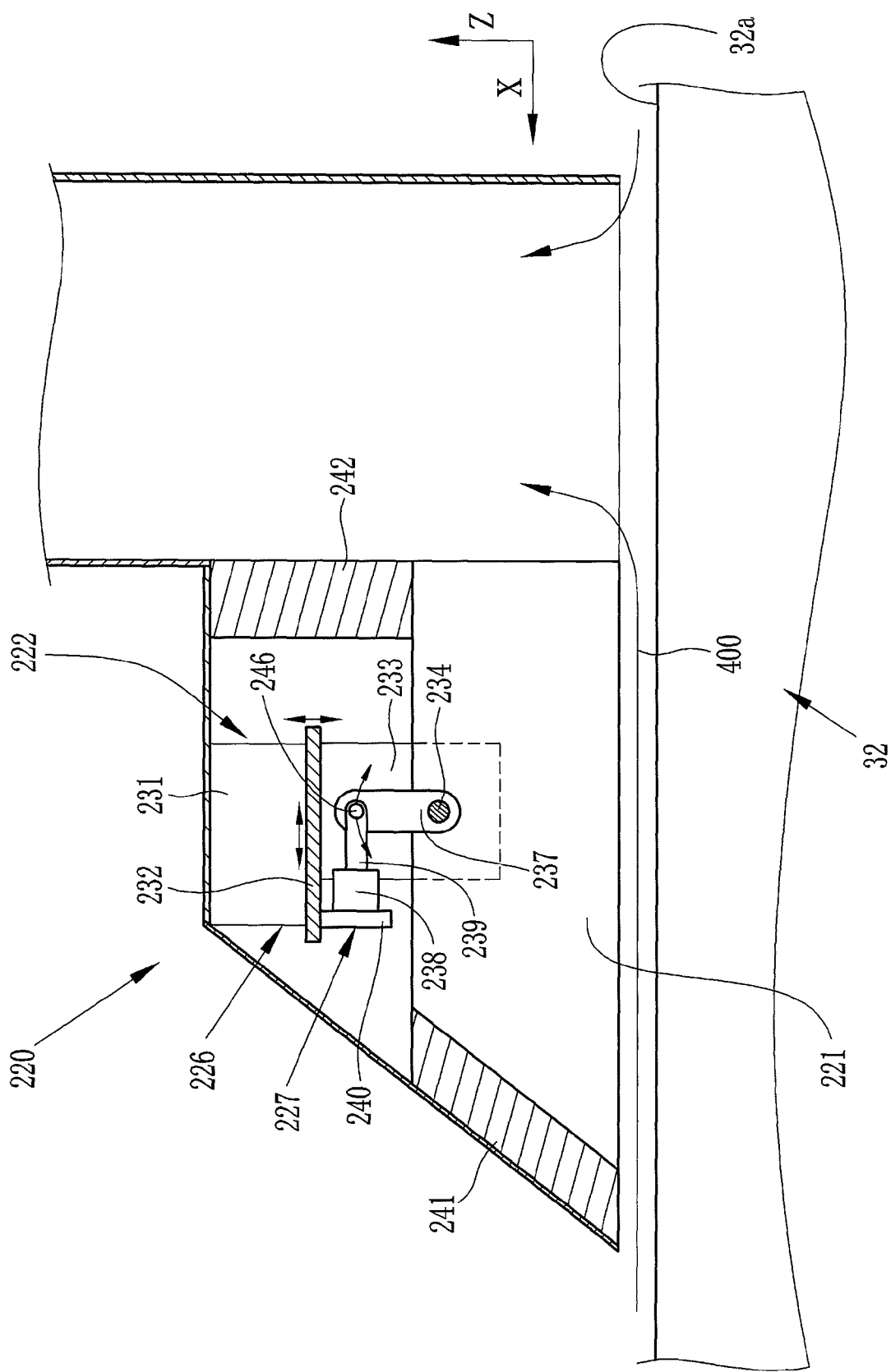
FIG. 10 is an explanatory view schematically illustrating a decompression chamber according to a second embodiment.

As shown in FIG. 10, a decompression chamber 220 has the same casing as that of the above embodiment, and the casing contains partition members 221 and a partition member shift mechanism 222. The partition member 221 includes the outer side seal plates and the inner side seal plates as in the case of the partition member 67 of the above embodiment. Each of the outer side seal plates is movable in the Y direction and set to an appropriate position in accordance with the position of each of the side ends 40a of the casting bead 40 when the width of the casting bead 40 is changed, for example. In the similar manner, the position of each of the inner side seal plates may be changed in conjunction with change in the position of each of the outer side seal plates.

The partition member shift mechanism 222 includes an XYZ shift section 226 and a Y-axis rotational shift section 227. The XYZ shift section 226 is composed of an XYZ shift section main body 231, a mounting board 232, a bracket 233, and a mounting shaft 234. The XYZ shift section main body 231 is disposed in the casing of the decompression chamber 220. The XYZ shift section main body 231 is a well-known shifter, and can shift the mounting board 232 in X, Y, and Z directions. The pair of brackets 233 is attached to the mounting board 232 so as to sandwich the partition member 221 from both sides in the Y direction. The mounting shaft 234 is disposed along the Y direction so as to be inserted into the pair of brackets 233 and the partition member 221. The mounting shaft 234 is rotatable around a mounting shaft main body thereof. The partition member 221 is fixed to the mounting shaft 234. Accordingly, the XYZ shift section 226 can shift the partition member 221 in the X, Y, and Z directions.

The Y-axis rotational shift section 227 is composed of the mounting shaft 234, an arm 237, a rotational shifter 238, and a plunger 239. The rotational shifter 238 is attached to the mounting board 232 through a mounting tool 240. The rotational shifter 238 has the plunger 239 movable in a predetermined direction. One end of the arm 237 is fixed to the mounting shaft 234, and the other end of the arm 237 and the plunger 239 are pivotally supported by a pin 246. The rotational shifter 238 shifts the plunger 239 in a predetermined direction such that the partition member 221 rotates around the mounting shaft 234.

In order to prevent the flowing air 400 generated due to the decompression from flowing between the casing of the decompression chamber 220 and the partition member 221 and thus causing decrease in the static pressure effect in the casing, air shielding portions 241 and 242 are preferably provided in the clearance between the casing of the decompression chamber 220 and the partition member 221. The air shielding portions 241 and 242 are preferably a sheet or a sponge made of Teflon (registered trademark) or Viton (registered trademark). In the similar manner, air shielding portions equivalent to the air shielding portions 241 and 242 may be provided in the clearance between the partition member 67 (see FIG. 3) and the casing 60 (see FIG. 3).

In a case where the partition member shift mechanism 222 is used to shift and position the partition member 221 in the decompression chamber 220, non-contact type clearance sensors are arbitrarily disposed at the lower end surface of the partition member 221. The clearance sensors detect the clearance between the partition member 221 and the casting drum 32. The degree of clearance detected by the clearance sensors is adjusted to be within a predetermined range such that the clearance between the partition member 221 and the casting drum 32 is set constant in the X or Y direction. Note that instead of the clearance sensors, a digital camera may be used to capture an image of the clearance between the partition member 221 and the casting drum 32. The captured image data is subjected to image processing to detect the degree of the clearance. Based on the detected degree of the clearance, the partition member 221 may be positioned such that the degree of the clearance between the partition member 221 and the casting drum 32 is adjusted within the predetermined range.

Further, instead of adjusting the position of the partition member 221 based on the degree of the clearance between the partition member 221 and the casting drum 32, the following method may be adopted. A reference position of the partition member 221 is preliminarily determined. The degree of displacement of the. Partition member 221 from the reference position is obtained. The partition member 221 is shifted in the X, Y, and Z directions and further rotated around the Y axis such that there is no displacement of the partition member 221. Thus, the partition member 221 is positioned.

Note that the structure of each of the XYZ shift section 226 and the Y-axis rotational shift section 227 is not especially limited as long as the partition member 221 can be shifted in the X, Y, and Z directions and further rotate around the Y axis in the decompression chamber 220. Further, in a case where there is no need for adjusting the position of the partition member 221 in all of the X, Y, and Z directions and around the Y axis, the position of the partition member 221 may be adjusted in only necessary directions. In this case, it is sufficient that only a shift section for adjustment in necessary directions is provided, and other shift sections may be omitted. Additionally, as necessary, the partition member may be caused to rotate around X axis or Z axis.

Further, for the purpose of casting the dope, co-casting by simultaneous stacking and co-casting by sequential stacking can be selectively used. In the co-casting by simultaneous stacking, two or more kinds of dopes are subjected to co-casting simultaneously to be stacked. In the co-casting by sequential stacking, plural kinds of dopes are subjected to co-casting sequentially to be stacked. Note that they may be combined to be used. In the co-casting by simultaneous stacking, a casting die provided with a feed block may be used, or a multi-manifold-type casting die may be used. Note that, in a multilayer film obtained by the co-casting, at least any one of thickness of the layer at the side exposed to air and the thickness of the layer at the side of the support is preferably 0.5 to 30% relative to the total thickness of the film. Further, in the co-casting by simultaneous stacking, when the dope is cast onto the support through a die slit (discharge port of the casting die), the dope with high viscosity is preferably surrounded by the dope with low viscosity. In the casting bead formed so as to extend from the die slit to the support, the dope exposed outside preferably has a relative proportion of alcohol higher than that of the dope located inside.

Moreover, the present invention is also applicable to a casting device using a casting belt instead of the casting drum 32. The casting belt is bridged over rotation rollers and to move.

Various changes and modifications are possible in the present invention and may be understood to be within the present invention.

What is claimed is:

1. A casting method comprising the steps of:
    discharging a dope through a casting die onto a support moving continuously to form a casting film;
    sucking air of an upstream area from a casting bead in a moving direction of said support to decompress said upstream area by a decompression chamber, said decompression chamber covering said support in an upstream side from said casting bead in the moving direction of said support, said casting bead being said casting dope extending from said casting die to said support; and
    shifting at least one of partition members disposed in said decompression chamber, each of said partition members extending in the moving direction of said support;
    wherein at least one of said partition members is shifted in the width direction of said casting bead;

wherein said partition members include a first side seal plate movable in the width direction of said casting bead and disposed in the upstream side from a side end of said casting bead in the moving direction of said support, and said first side seal plate is shifted in accordance with a position of said side end of said casting bead; and wherein a side air shielding unit blocks a clearance between said first side seal plate and a side board of said decompression chamber, and said side air shielding unit is disposed in the periphery of said support and has a width changeable in conjunction with change in a position of said first side plate.

2. A casting method as defined in claim 1, wherein each of said partition members is mounted to a mounting shaft, a longitudinal direction of said mounting shaft corresponds to a width direction of said casting bead, and at least one of said partition members is rotated around said mounting shaft.

3. A casting method as defined in claim 1 wherein a second side seal plate disposed inward from said first side seal plate in the width direction of said casting bead is shifted in the width direction of said casting bead in conjunction with change in the position of said first side seal plate.

* * * * *